United States Patent
Shoji (10) Patent No.: US 10,449,805 B2
(45) Date of Patent: Oct. 22, 2019

(54) NON-PNEUMATIC TIRE

(71) Applicant: BRIDGESTONE CORPORATION, Tokyo (JP)

(72) Inventor: Takanori Shoji, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 45 days.

(21) Appl. No.: 15/543,248

(22) PCT Filed: Jan. 5, 2016

(86) PCT No.: PCT/JP2016/050094
§ 371 (c)(1),
(2) Date: Jul. 13, 2017

(87) PCT Pub. No.: WO2016/114168
PCT Pub. Date: Jul. 21, 2016

(65) Prior Publication Data
US 2017/0368881 A1 Dec. 28, 2017

(30) Foreign Application Priority Data

Jan. 15, 2015 (JP) ................................. 2015-005719

(51) Int. Cl.
*B60C 11/00* (2006.01)
*B60B 9/04* (2006.01)
(Continued)

(52) U.S. Cl.
CPC .............. *B60C 11/005* (2013.01); *B60B 9/04* (2013.01); *B60C 7/00* (2013.01); *B60C 7/14* (2013.01);
(Continued)

(58) Field of Classification Search
CPC ......... B60C 11/005; B60C 7/14; B60C 11/00; B60C 7/00; B60C 2007/146; B60B 9/04; B60B 2900/311; B60B 2900/212
(Continued)

(56) References Cited

U.S. PATENT DOCUMENTS

2007/0154202 A1\* 7/2007 Lee ...................... H04N 5/2329
396/153
2008/0142132 A1 6/2008 Kleffmann et al.
(Continued)

FOREIGN PATENT DOCUMENTS

CN 101277825 A 10/2008
JP 60-018407 A 1/1985
(Continued)

OTHER PUBLICATIONS

Communication dated Sep. 4, 2018 from the State Intellectual Property Office of the P.R.C. in counterpart Chinese application No. 2016800058067.
(Continued)

*Primary Examiner* — S. Joseph Morano
*Assistant Examiner* — Jean W Charleston
(74) *Attorney, Agent, or Firm* — Sughrue Mion, PLLC (57) ABSTRACT

There is provided a non-pneumatic tire (1), which includes an attachment body (11) that is attached to an axle, a ring-shaped body (13) that surrounds the attachment body (11) from an outside in a tire radial direction, a connection member (15) that displaceably connects the attachment body (11) and the ring-shaped body (13) to each other, and a cylindrical tread member (16) that is externally mounted on the ring-shaped body (13), in which the tread member (16) includes a base rubber portion (41) that is positioned at an inside in the tire radial direction, and a cap rubber portion (42) that is positioned at an outside of the base rubber
(Continued)

portion (41) in the tire radial direction, and in which the rigidity of the base rubber portion (41) is lower than the rigidity of the cap rubber portion (42).

12 Claims, 6 Drawing Sheets

(51) Int. Cl.
    *B60C 7/00* (2006.01)
    *B60C 7/14* (2006.01)
(52) U.S. Cl.
    CPC ......... *B60C 11/00* (2013.01); *B60B 2900/212* (2013.01); *B60B 2900/311* (2013.01); *B60C 2007/146* (2013.01)
(58) Field of Classification Search
    USPC .......................................................... 152/12
    See application file for complete search history.

(56) References Cited

U.S. PATENT DOCUMENTS

| 2009/0160957 | A1* | 6/2009 | Deng ................ H04N 5/23248 348/208.99 |
| 2011/0176014 | A1* | 7/2011 | Hong .................... H04N 5/145 348/208.4 |
| 2011/0176043 | A1* | 7/2011 | Baker .................... G06T 5/003 348/296 |
| 2011/0267514 | A1* | 11/2011 | D'Angelo ............ H04N 5/2329 348/296 |
| 2012/0092559 | A1* | 4/2012 | Ubillos .................. H04N 19/86 348/607 |
| 2014/0071299 | A1* | 3/2014 | Grundmann ............ G06T 5/003 348/207.1 |
| 2015/0273946 | A1 | 10/2015 | Abe et al. |
| 2016/0089935 | A1 | 3/2016 | Iwamura et al. |
| 2017/0236257 | A1* | 8/2017 | Wu ........................ G06T 5/006 348/208.4 |
| 2017/0272668 | A1* | 9/2017 | Ribardo, Jr. ......... H04N 5/3532 |

FOREIGN PATENT DOCUMENTS

| JP | 2012-035792 A | 2/2012 |
| JP | 2014-009852 A | 1/2014 |
| JP | 2014-091453 A | 5/2014 |
| JP | 2014-118128 A | 6/2014 |
| WO | 2011/046553 A1 | 4/2011 |
| WO | 2014/188912 A1 | 11/2014 |

OTHER PUBLICATIONS

International Search Report for PCT/JP2016/050094 dated Mar. 8, 2016 [PCT/ISA/210].
Extended European Search Report dated Jan. 31, 2018 issued by the European Patent Office in counterpart application No. 16737239.0.

* cited by examiner

NON-PNEUMATIC TIRE

TECHNICAL FIELD

The present invention relates to a non-pneumatic tire which does not require filling of pressurized air therein upon use thereof.

This application is a National Stage of International Application No. PCT/JP2016/050094, filed on Jan. 5, 2016. Priority is claimed on Japanese Patent Application No. 2015-005719, filed on Jan. 15, 2015, the content of which is incorporated herein by reference.

BACKGROUND ART

In the related art, a non-pneumatic tire disclosed in the following Patent Document 1 is known. The non-pneumatic tire includes an attachment body which is attached to an axle, an outer tube body which surrounds the attachment body from an outside in a tire radial direction, a connection member which connects the attachment body and the outer tube body, and a cylindrical tread member which is externally mounted on the outer tube body.

CITATION LIST

Patent Document

[Patent Document 1] Japanese Unexamined Patent Application, First Publication No. 2014-91453

SUMMARY OF INVENTION

Technical Problem

In the non-pneumatic tire of the related art described above, for example, when a load applied from the road surface is greatly applied to a portion of a tread member along a tire width direction so as to be biased, stress generated in the tread member is greatly transferred to a portion of an outer tube body and the outer tube body is likely to be damaged starting from the portion thereof, and thus there is room for improvement in increasing the strength thereof.

The invention has been made in view of the above circumstances, and an object thereof is to improve strength of the non-pneumatic tire.

Solution to Problem

In order to solve the above problem, the invention proposes the following means.

According to the invention, there is provided a non-pneumatic tire; including an attachment body which is attached to an axle, an outer tube body which surrounds the attachment body from an outside in a tire radial direction, a connection member which connects the attachment body and the outer tube body to each other, and a cylindrical tread member which is externally mounted on the outer tube body, in which the tread member includes a base rubber portion which is positioned on an inside in the tire radial direction and a cap rubber portion which is positioned on an outside of the base rubber portion in the tire radial direction, and in which rigidity of the base rubber portion is lower than that of the cap rubber portion.

Advantageous Effects of Invention

According to the invention, the strength of the non-pneumatic tire can be increased.

DESCRIPTION OF EMBODIMENTS

Hereinafter, an embodiment according to the invention will be described with reference to FIG. 1 to FIG. 6.

Figure 1:
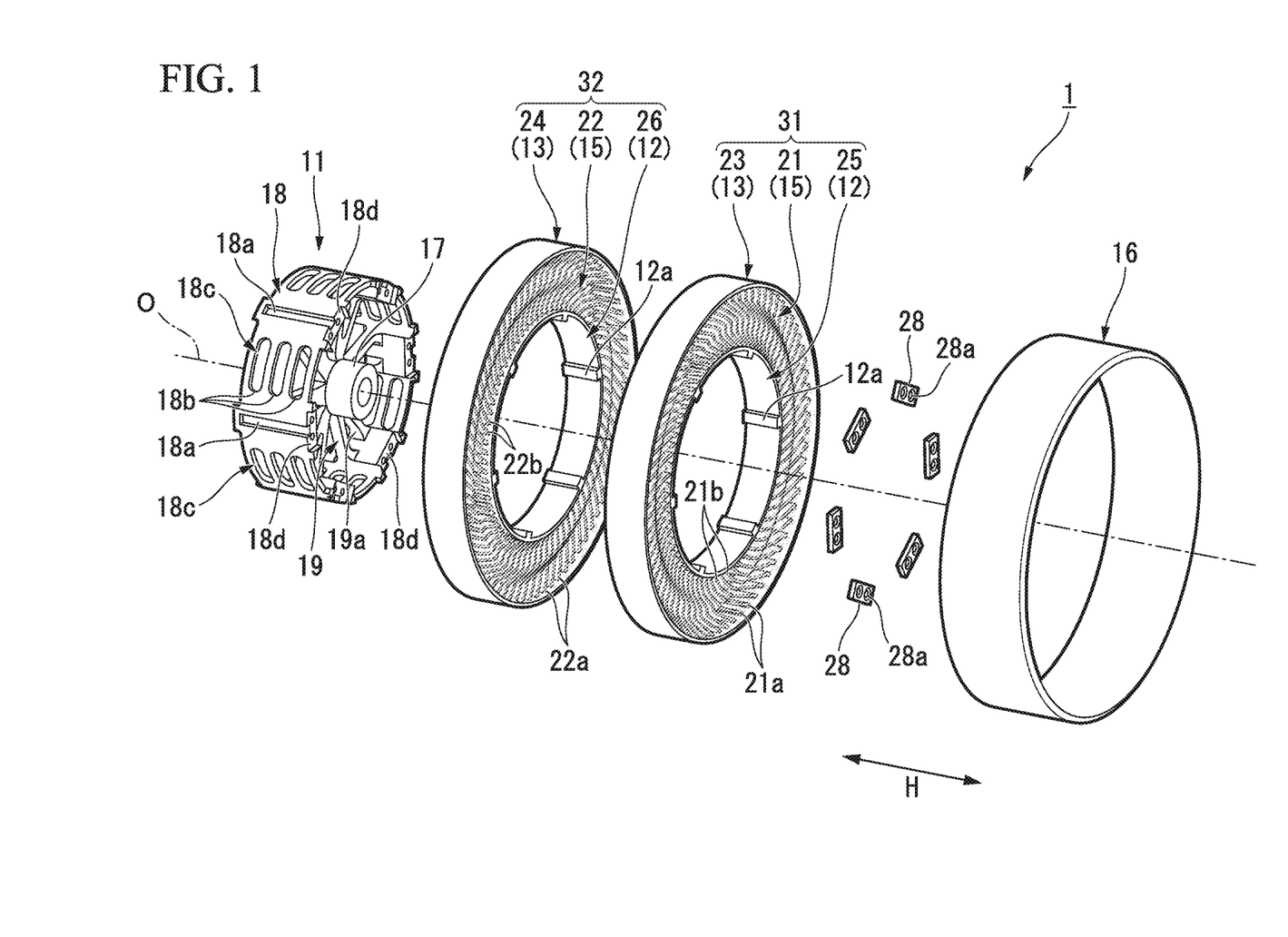
FIG. 1 is a view showing an embodiment of a non-pneumatic tire according to the invention and a schematic perspective view showing a state where a portion of the non-pneumatic tire is disassembled.
Figure 2:
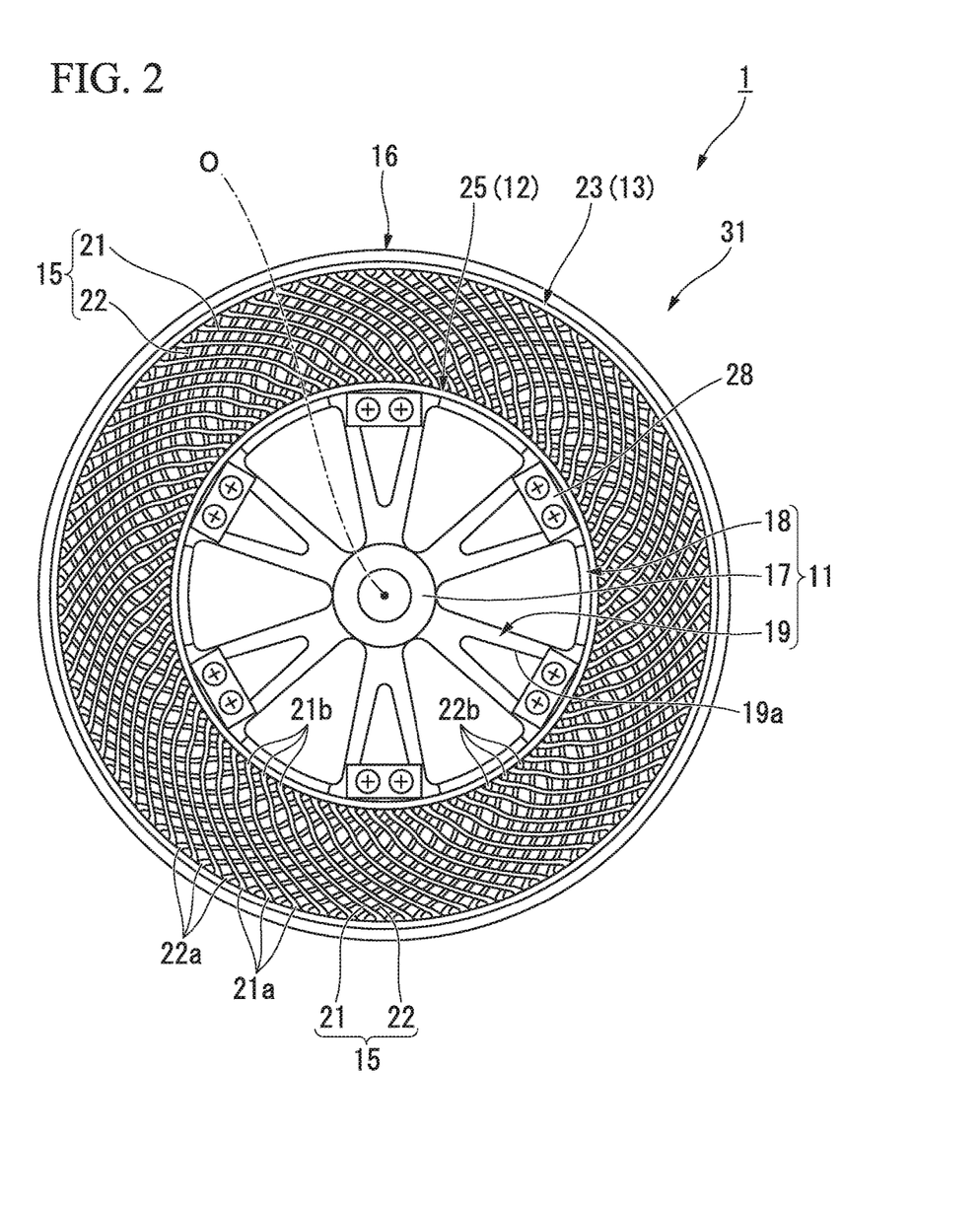
FIG. 2 is a tire side view of the non-pneumatic tire shown in FIG. 1 viewed from an outside of a vehicle body in a tire width direction.

As shown in FIG. 1 and FIG. 2, a non-pneumatic tire 1 of the present embodiment includes an attachment body 11 which is attached to an axle (not shown), a cylindrical ring-shaped body 13 (outer tube body) which surrounds the attachment body 11 from an outside in a tire radial direction, a plurality of connection members 15 which are disposed between the attachment body 11 and the ring-shaped body 13 along a tire peripheral direction and connect the attachment body 11 and the ring-shaped body 13 to each other to be relatively elastically displaceable, and a cylindrical tread member 16 which is externally mounted to the ring-shaped body 13.

The non-pneumatic tire 1 of the present embodiment may be used for a two-wheeled vehicle such as a bicycle or the like, may drive in a state of being a camber angle of about 30 degrees, and, for example, may be adapted for small vehicles or the like which is defined in Japanese Industrial Standard JIS T 9208 and is driven at a low speed such as a handle type electric wheelchair. In addition, the size of the non-pneumatic tire 1 is not particularly limited, but may be 3.00-8 or the like, for example. In addition, the non-pneumatic tire 1 may be used for a passenger car.

The size, in this case, is not particularly limited, but it may also be, for example, 155/65R13 or the like.

The attachment body 11, the ring-shaped body 13, and the tread member 16 described above are disposed coaxially with the common shaft, respectively. Hereinafter, this common axis is referred to as an axis O, a direction along the axis O is referred to as the tire width direction H, a direction orthogonal to the axis O is referred to as the tire radial direction, and a direction orbiting around the axis O is referred to as a tire peripheral direction. The attachment body 11, the ring-shaped body 13, and the tread member 16 are disposed in a state where center portions in the tire width direction H are coincident with each other. In addition, the outer diameter of the ring-shaped body 13 is equal regardless of the position in the tire width direction H.

The attachment body 11 includes a mounting tube portion 17 on which a tip portion of the axle is mounted, an outer ring portion 18 which surrounds the mounting tube portion 17 from the outside in the tire radial direction, and a plurality of ribs 19 which connects the mounting tube portion 17 and the outer ring portion 18 to each other.

The mounting tube portion 17, the outer ring portion 18, and the ribs 19 are integrally formed of a metal material such as an aluminum alloy, for example. The mounting tube portion 17 and the outer ring portion 18 are respectively formed in a cylindrical shape and are disposed coaxially with an axis line O. The plurality of ribs 19 are disposed at an equal interval in the peripheral direction, for example.

On the outer peripheral surface of the outer ring portion 18, a plurality of key groove portions 18*a* which is depressed inward in the tire radial direction and extends in the tire width direction H are formed at intervals in the tire peripheral direction. The key groove portion 18*a* is open only on the outer side (a first side) of the vehicle body in the tire width direction H on the outer peripheral surface of the outer ring portion 18 and is closed on the inner side (a second side) of the vehicle body in the tire width direction H.

In the outer ring portion 18, in a portion positioned between the adjacent key groove portions 18*a* in the tire peripheral direction, a plurality of lightening holes 18*b* penetrating the outer ring portion 18 in the tire radial direction are formed at intervals in the tire width direction H. A plurality of hole rows 18*c* formed by the plurality of lightening holes 18*b* are formed at intervals in the tire peripheral direction. Similarly, each rib 19 also has a lightening hole 19*a* penetrating the rib 19 in the tire width direction H.

A recessed portion 18*d* into which the plate material 28 having a through hole 28*a* is fitted is formed at a position corresponding to the key groove portion 18*a* on an edge of a first side in the tire width direction H of the outer ring portion 18. The recessed portion 18*d* is recessed toward a second side in the tire width direction H. In addition, a female thread portion which communicates with the through hole 28*a* of the plate material 28 fitted in the recessed portion 18*d* is formed on a wall surface of the wall surfaces defining the recessed portion 18*d* facing the first side in the tire width direction H.

A plurality of the through holes 28*a* are formed on the plate material 28 at intervals in the tire peripheral direction.

Similarly, a plurality of female thread portions are formed on the wall surface of the recessed portion 18*d* at intervals in the tire peripheral direction. In the example shown, two through holes 28*a* and two female threaded portions are formed, but the number thereof is not limited to two.

A cylindrical exterior body 12 is externally fitted to the attachment body 11. A ridge portion 12*a* protruding inward in the tire radial direction and extending over the entire length in the tire width direction H is formed on the inner peripheral surface of the exterior body 12. A plurality of ridge portions 12*a* are formed at intervals in the tire peripheral direction on the inner peripheral surface of the exterior body 12 and are fitted respectively in the key groove portions 18*a* formed on the attachment body 11.

Then, in a state where the ridge portion 12*a* is fitted in the key groove portion 18*a*, the exterior body 12 is fixed to the attachment body 11 by a bolt (not shown) being screwed into the female threaded portion through the through hole 28*a* of the plate material 28 fitted in the recessed portion 18*d*.

Of the wall surfaces defining the key groove portion 18*a*, a pair of side wall surfaces opposed to each other in the tire peripheral direction and the bottom wall surface are formed so as to be orthogonal to each other. In addition, a pair of side wall surfaces rising from the inner peripheral surface of the exterior body 12 and a top wall surface facing inward in the tire radial direction in the outer surface of the ridge portion 12*a* are also formed to be orthogonal in the same manner. The sizes of the ridge portion 12*a* and the key groove portion 18*a* in the tire peripheral direction are equal to each other.

With such a configuration, the ridge portion 12*a* is fitted in the key groove portion 18*a* with less rattling and high precision.

The connection member 15 connects the outer peripheral surface side of the attachment body 11 and the inner peripheral surface side of the ring-shaped body 13 to each other to be relatively elastically displaceable. In the example shown, the connection member 15 includes a first connection plate 21 and a second connection plate 22 that connects the outer peripheral surface of the exterior body 12 externally fitted to the attachment body 11 and the inner peripheral surface of the ring-shaped body 13 to each other. Both of the first connection plate 21 and the second connection plate 22 are elastically deformable plate materials.

A plurality of the first connection plates 21 are disposed along the tire peripheral direction at a position of the first side along the tire width direction H. A plurality of second connection plates 22 are disposed along the tire peripheral direction at a position on the second side along the tire width direction H. In other words, the first connection plate 21 and the second connection plate 22 are disposed spaced apart from each other in the tire width direction H, and a plurality of the first connection plates 21 and the second connection plate 22 are disposed along the tire peripheral direction at respective positions. For example, 60 first connection plates 21 and 60 second connection plates 22 are provided along the tire peripheral direction.

The plurality of connection members 15 are disposed separately at positions that are rotationally symmetrical about the axis O between the exterior body 12 and the ring-shaped body 13. In addition, all the connection members 15 have the same shape and the same size to each other, and the lateral width of the connection member 15 along the tire width direction H is smaller than the lateral width of the ring-shaped body 13 along the tire width direction H.

The first connection plates 21 adjacent to each other in the tire peripheral direction are not in contact with each other. Similarly, the second connection plates 22 adjacent to each other in the tire peripheral direction are also not in contact with each other. In addition, the first connection plate 21 and the second connection plate 22 adjacent to each other in the tire width direction H are also not in contact with each other. Further, the first connection plate 21 and the second connection plate 22 have the same lateral width and thickness along the tire width direction H.

Figure 3:
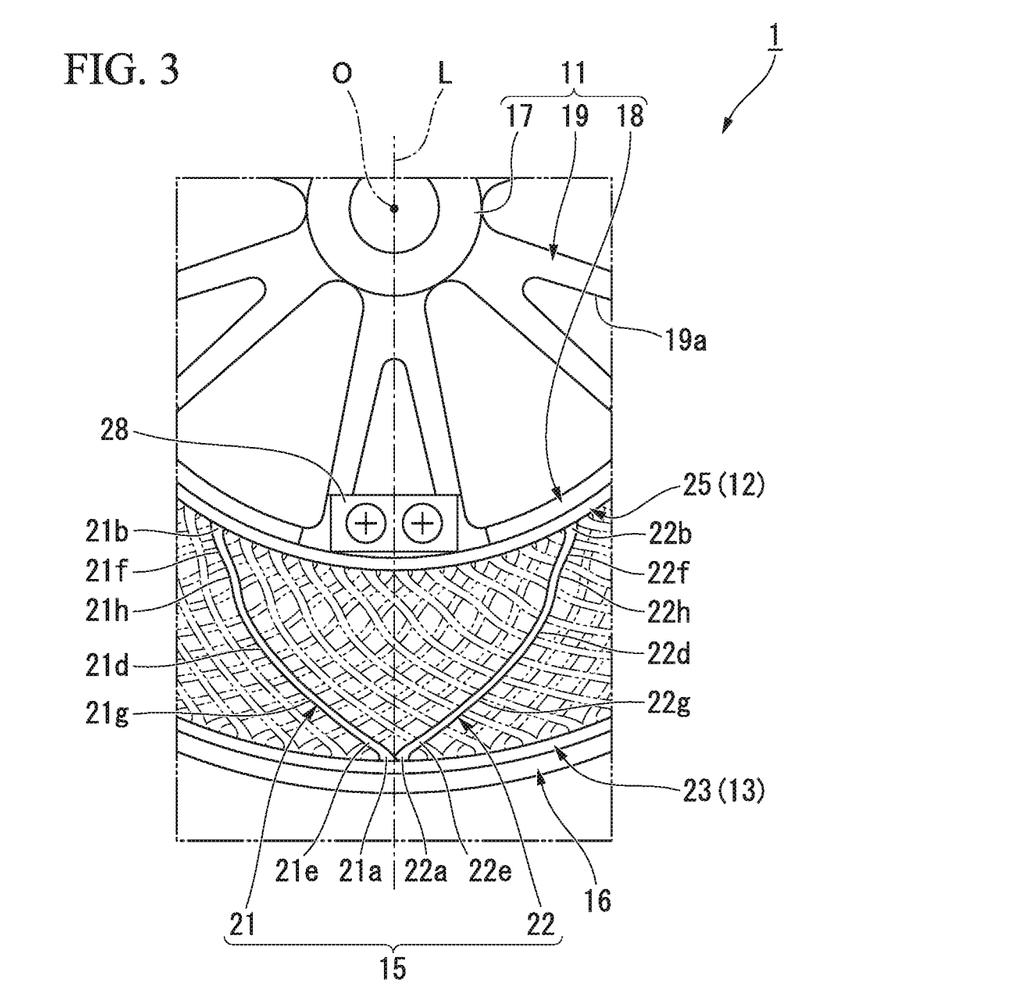
FIG. 3 is an enlarged view showing a main portion of FIG. 2.

As shown in FIG. 3, the outer end portion (a first end portion) 21*a* of the first connection plate 21 connected to the ring-shaped body 13 is positioned on a first side of the inner end portion (a second end portion) 21*b* connected to the exterior body 12 in the tire peripheral direction. On the other hand, the outer end portion (a first end portion) 22*a* of the second connection plate 22 connected to the ring-shaped body 13 is positioned on a second side of the inner end portion (a second end portion) 22*b* connected to the exterior body 12 in the tire peripheral direction.

Each of the first end portions 21a and 22a of the first connection plate 21 and the second connection plate 22 constituting one connection member 15 are connected to the same position in the tire peripheral direction in a state where the positions thereof in the tire width direction H are different from each other on the inner peripheral surface of the ring-shaped body 13.

In the first connection plate 21 and the second connection plate 22, a plurality of curved portions 21d to 21f and 22d to 22f curved in the tire peripheral direction are formed on an intermediate portion positioned between the first end portions 21a and 22a and the second end portions 21b and 22b.

The plurality of curved portions 21d to 21f and 22d to 22f are formed along the extending direction of the first connection plate 21 and the second connection plate 22 in a tire side view of the non-pneumatic tire 1 viewed from the tire width direction H. In the example shown, the plurality of curved portions 21d to 21f in the first connection plate 21 and the plurality of curved portions 22d to 22f in the second connection plate 22 are formed such that the first connection plate 21 and the second connection plate 22 are adjacent to each other in an extending direction and the curved directions thereof are opposite to each other.

The plurality of curved portions 21d to 21f formed on the first connection plate 21 includes the first curved portion 21d which is curved so as to protrude toward the second side in the tire peripheral direction, the second curved portion 21e which is positioned between the first curved portion 21d and the first end portion 21a and is curved so as to protrude toward the first side in the tire peripheral direction, and the third curved portion 21f which is positioned between the first curved portion 21d and the second end portion 21b and is curved so as to protrude toward the first side in the tire peripheral direction. The second curved portion 21e is connected to the first end portion 21a.

The plurality of curved portions 22d to 22f formed on the second connection plate 22 includes the first curved portion 22d which is curved so as to protrude toward the first side in the tire peripheral direction, the second curved portion 22e which is positioned between the first curved portion 22d and the first end portion 22a and is curved so as to protrude toward the second side in the tire peripheral direction, and the third curved portion 22f which is positioned between the first curved portion 22d and the second end portion 22b and is curved so as to protrude toward the second side in the tire peripheral direction. The second curved portion 22e is connected to the first end portion 22a.

In the example shown, the first curved portions 21d and 22d are formed to have a larger curvature radius in a tire side view than the second curved portions 21e and 22e and the third curved portions 21f and 22f, and are disposed on the center portions in an extending direction of the first connection plate 21 and the second connection plate 22.

The lengths of the first connection plate 21 and the second connection plate 22 are equal to each other. The second end portions 21b and 22b of the first connection plate 21 and the second connection plate 22 respectively are connected to positions on the outer peripheral surface of the exterior body 12 spaced apart on the first side and the second side by the same distance respectively in the tire peripheral direction about the axis O from a position facing the first end portions 21a and 22a in the tire radial direction on the outer peripheral surface of the exterior body 12.

Specifically, the second end portions 21b and 22b of the first connection plate 21 and the second connection plate 22 are connected to the outer peripheral surface of the exterior body 12 so that an angle formed between the line connecting the first end portion 21a and the second end portion 21b of the first connection plate 21 and the line connecting the first end portion 22a and the second end portion 22b of the second connection plate 22 has, for example, an angle between 20° and 135°.

In addition, the first curved portions 21d and 22d, the second curved portions 21e and 22e, and the third curved portions 21f and 22f of the first connection plate 21 and the second connection plate 22 protrude in the opposite direction of the tire peripheral direction to each other and to the same size, respectively.

With the configuration described above, as shown in FIG. 3, the shape of each of the connection members 15 in a tire side view extends along the tire radial direction and is line-symmetrical about a virtual line L which passes through each of the first end portion 21a and 22a of the first connection plate 21 and the second connection plate 22 as a symmetrical axis.

The exterior body 12, the ring-shaped body 13, and the plurality of connection members 15 described above are integrally formed of a synthetic resin material, for example. The synthetic resin material may be, for example, only one type of resin material, a mixture containing two or more types of resin materials, or a mixture containing at least one type of resin material and at least one type of elastomer and further, may also include an antioxidant, a plasticizer, a filler, or an additive such as a pigment, for example.

Incidentally, as shown in FIG. 1, the exterior body 12 is divided into a first exterior body 25 positioned on the first side in the tire width direction H and a second exterior body 26 positioned on the second side in the tire width direction H. Similarly, the ring-shaped body 13 is divided into a first ring-shaped body 23 (divided tube) positioned on the first side in the tire width direction H and a second ring-shaped body 24 (divided tube) positioned on the second side in the tire width direction H. In the ring-shaped body 13, the ends of the first and second ring-shaped bodies 23 and 24 (a plurality of divided tubes) in the tire width direction H disposed adjacent to each other in the tire width direction H are connected to each other.

In the example shown, the exterior body 12 and the ring-shaped body 13 are divided at the center portion in the tire width direction H, respectively.

Figure 4:
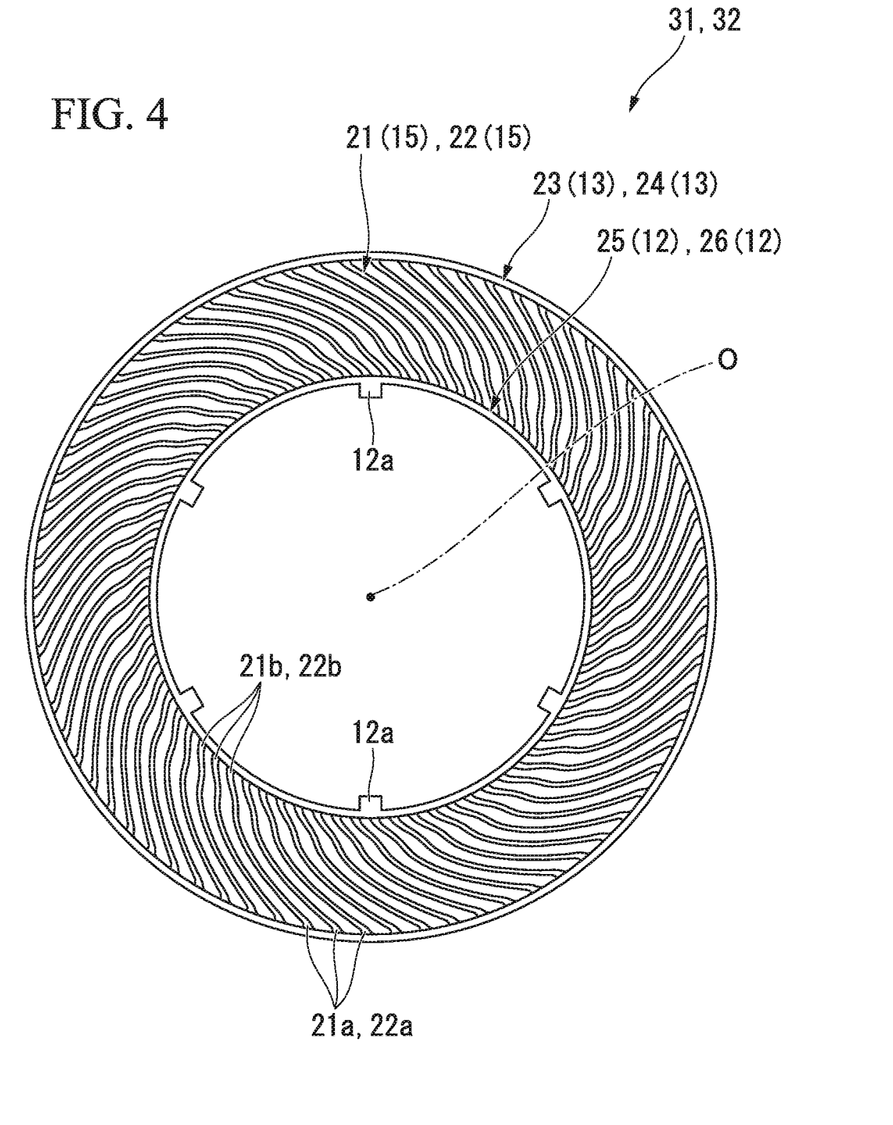
FIG. 4 is a tire side view of a first divided case body viewed from the outside of the vehicle body in the tire width direction, or a tire side view of a second divided case body viewed from an inside of the vehicle body in the tire width direction, in the non-pneumatic tires shown in FIG. 1.

Then, as shown in FIG. 4, the first exterior body 25 and the first ring-shaped body 23 are integrally formed with the first connection plate 21, for example, by injection molding. The second exterior body 26 and the second ring-shaped body 24 are integrally formed with the second connection plate 22, for example, by injection molding.

Hereinafter, a unit in which the first exterior body 25, the first ring-shaped body 23, and the first connection plate 21 are integrally formed is referred to as a first divided case body 31 and a unit in which the second exterior body 26, the second ring-shaped body 24 and the second connection plate 22 are integrally formed is referred to as a second divided case body 32.

As the injection molding, in the case of the first divided case body 31 as an example, a general method of simultaneously molding the entire first divided case body 31 may be used. In addition, as the injection molding, it may be an insert molding by a portion of the first exterior body 25, the first ring-shaped body 23, and the first connection plate 21 becomes an insert product the rest thereof is injection-molded. Alternatively, the injection molding may be a so-called two-color molding or the like. In a case where the entire first divided case body 31 is injection-molded at the same time, a plurality of ridge portions 12a formed on the exterior body 12 may be used as a gate portion.

These points are also similarly applied to the second divided case body 32.

In addition, when taking the first divided case body 31 as an example when injection molding, the first exterior body 25, the first ring-shaped body 23, and the first connection plate 21 may be formed of different materials from each other or may be formed of the same material. As this material, for example, a metal material, a resin material and the like can be included, but from the viewpoint of weight reduction, a resin material, particularly a thermoplastic resin is preferable.

These points are also similarly applied to the second divided case body 32.

Figure 5:
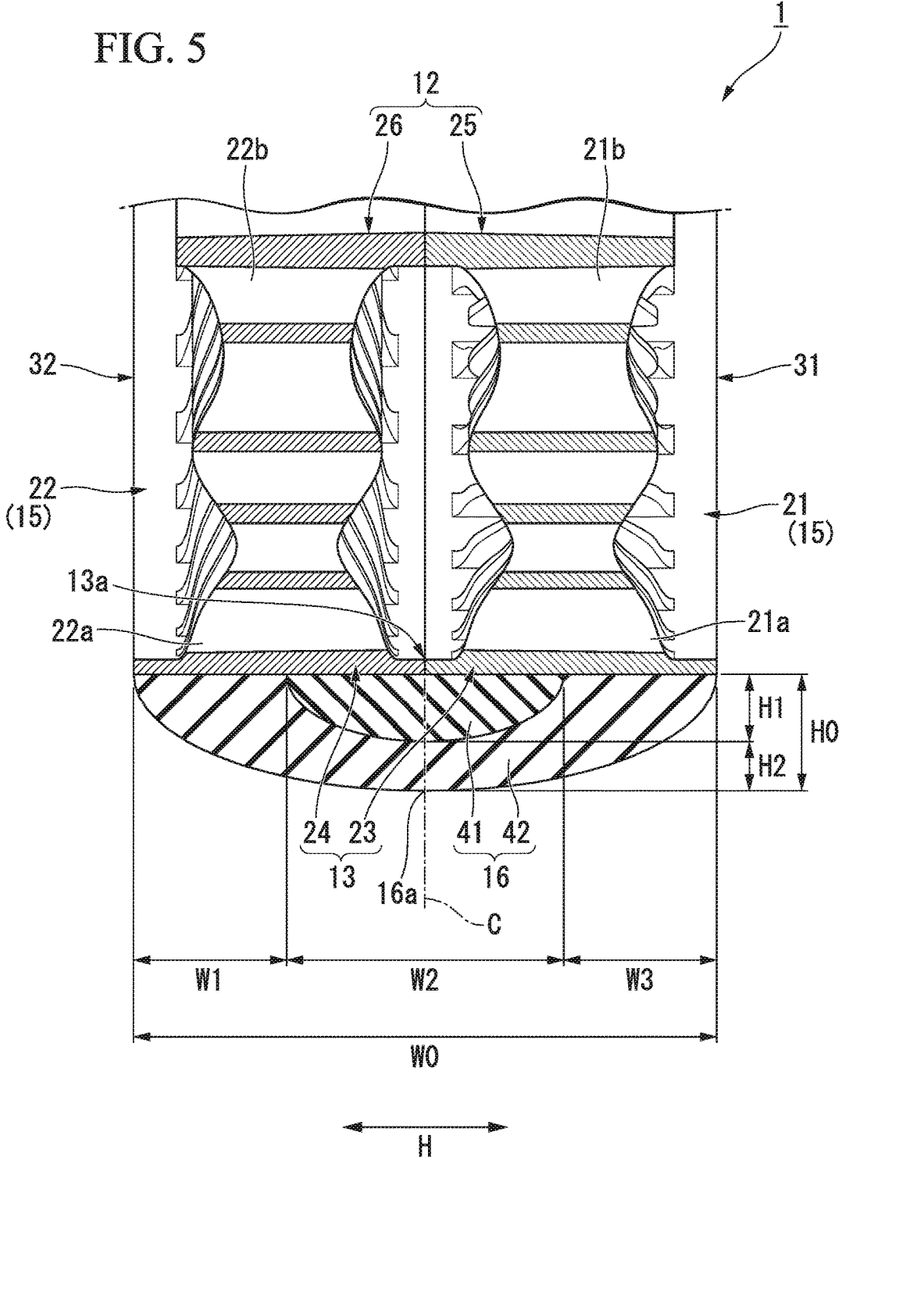
FIG. 5 is a cross-sectional view of a portion including a ring-shaped body and a tread member in the non-pneumatic tire shown in FIG. 1.

As shown in FIG. 5, in each of the first divided case body 31 and the second divided case body 32, the central portions of the first connection plate 21 and the second connection plate 22 in the tire width direction H are positioned at the inside (center side) in the tire width direction H of the center portions of the first ring-shaped body 23 and the second ring-shaped body 24 in the tire width direction H. In addition, the central portions of the first exterior body 25 and the second exterior body 26 in the tire width direction H is positioned at the inside in the tire width direction H of the center portions of the first connection plate 21 and the second connection plate 22 in the tire width direction.

However, it is not limited thereto, and in each of the first divided case body 31 and the second divided case body 32, at least two of the central portion of the first connection plate 21 and the second connection plate 22 in the tire width direction H, the center portion of the first ring-shaped body 23 and the second ring-shaped body 24 in the tire width direction H, and the center portion of the first exterior body 25 and the second exterior body 26 in the tire width direction H may be identical to each other.

The edges of the first ring-shaped body 23 and the second ring-shaped body 24 facing in the tire width direction H can be connected to each other, for example, by welding, fusing, adhesion or the like and a joining portion 13a in which the edges of in the first and second ring-shaped bodies 23 and 24 in the tire width direction H are connected to each other is provided on the ring-shaped body 13. In the case of welding, for example, hot plate welding or the like may be adopted.

Similarly, the first exterior body 25 and the second exterior body 26 are in contact in the edges thereof facing in the tire width direction H.

However, the first exterior body 25 and the second exterior body 26 may be formed so that the lateral widths thereof along the tire width direction H is smaller than that of the first ring-shaped body 23 and the second ring-shaped body 24.

In this case, in the first exterior body 25 and the second exterior body 26, when the first divided case body 31 and the second divided case body 32 are connected to each other, the edges of the first exterior body 25 and the second exterior body 26 facing in the tire width direction H are spaced apart from each other in the tire width direction. Therefore, for example, generation of burrs can be prevented on the inner peripheral surface of the exterior body 12 fitted onto the attachment body 11.

As shown in FIG. 4, the first divided case body 31 and the second divided case body 32 have the same shape and the same size as each other. When the first divided case body 31 and the second divided case body 32 are integrally connected to each other as described above, in order to make each connection member 15 line-symmetrical as seen in a tire side view, while the first divided case body 31 and the second divided case body 32 are aligned with each other in the tire peripheral direction, in a state where the directions of the first divided case body 31 and the second divided case body 32 are opposite to each other in the tire width direction H, the edges of the first ring-shaped body 23 and the second ring-shaped body 24 in the tire width direction H are collided and connected to each other.

Thereafter, by providing the tread member 16 to the first divided case body 31 and the second divided case body 32 integrally combined with each other, the non-pneumatic tire 1 can be obtained.

As shown in FIG. 1, the tread member 16 is formed in a cylindrical shape and integrally covers the entire outer peripheral surface side of the ring-shaped body 13. The inner diameter of the tread member 16 is equal over the entire length in the tire width direction H and the inner peripheral surface of the tread member 16 is in close contact with the outer peripheral surface of the ring-shaped body 13 over the entire area thereof. The inner diameter of the tread member 16 is a distance along the tire radial direction between the inner peripheral surface of the tread member 16 and the axis O.

The outer peripheral surface of the tread member 16 has a curved surface shape protruding outward in the tire radial direction in a cross section view taken along the tire width direction H as shown in FIG. 5, and the outer diameter of the tread member 16 gradually decreases as the tread member goes away from the maximum outer diameter portion 16a in the tire width direction H. The maximum outer diameter portion 16a of the tread member 16 is positioned at the center portion of the non-pneumatic tire 1 in the tire width direction H. The thickness of the tread member 16 along the tire radial direction gradually decreases as the tread member goes away from the maximum outer diameter portion 16a in the tire width direction H. The outer diameter of the tread member 16 is the distance along the tire radial direction between the outer peripheral surface of the tread member 16 and the axis O.

Figure 6:
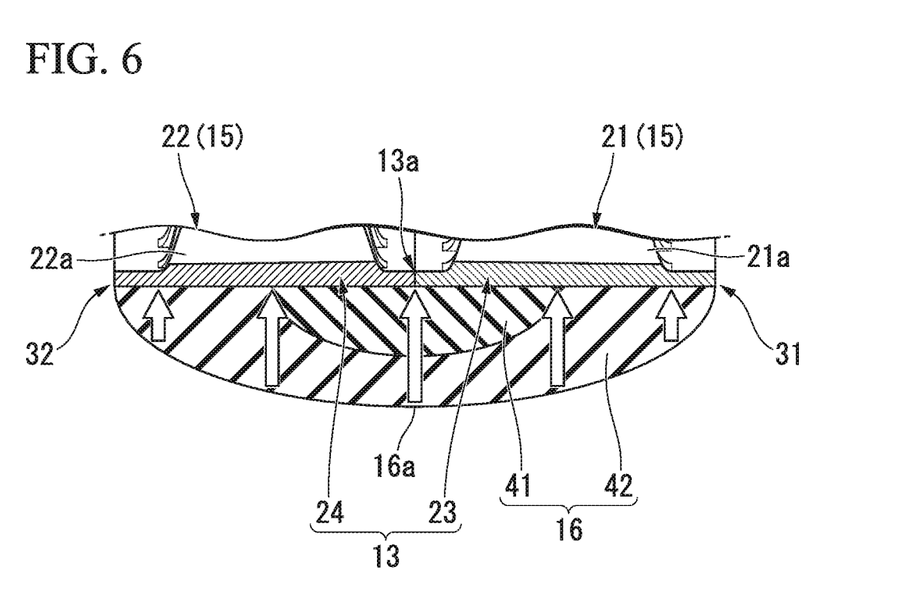
FIG. 6 is an enlarged view showing a main portion of FIG. 5.

The tread member 16 includes a base rubber portion 41 which is positioned on the inner side in the tire radial direction and a cap rubber portion 42 which is positioned outside of the base rubber portion 41 in the tire radial direction. Both the base rubber portion 41 and the cap rubber portion 42 extend over the entire periphery of the ring-shaped body 13 and the tread member 16 has a two-layer structure of the base rubber portion 41 and the cap rubber portion 42.

The base rubber portion 41 is disposed on the maximum outer diameter portion 16a of the tread member 16 along the tire width direction H and covers the joining portion 13a of the ring-shaped body 13 from outside in the tire radial direction. The size of the base rubber portion 41 in the tire width direction H is smaller than the size of the tread member 16 in the tire width direction H. In addition, the base rubber portion 41 is disposed at the center portion of the tread member 16 in the tire width direction H and the outer surface of the base rubber portion 41 is covered by a ring-shaped body 13 having a straight line shape in a cross-sectional view taken along the tire width direction H and the cap rubber portion 42. The outer peripheral surface of the base rubber portion 41 has a curved surface shape protruding outward in the tire radial direction in a cross section view taken along the tire width direction and the outer diameter of the base rubber portion 41 gradually decreases as the base rubber portion goes away from the maximum outer diameter portion in the tire width direction H. The maximum outer diameter portion of the base rubber portion 41 coincides with the maximum outer diameter portion 16a of the tread member 16 in the tire width direction H.

The cap rubber portion 42 covers the entire base rubber portion 41 and the base rubber portion 41 is not exposed on all the outer side in the tire radial direction and the outer side in the tire width direction H. The outer peripheral surface of the cap rubber portion 42 constitutes the outer peripheral surface of the tread member 16.

The base rubber portion 41 and the cap rubber portion 42 are formed to be line-symmetrical to the tread center plane C in a cross-sectional view taken along the tire width direction H. The tread center plane C is a virtual plane passing through the center of the tread member 16 in the tire width direction H and orthogonal to the axis O and in the present embodiment, the tread center plane C passes through the maximum outer diameter portion 16a of the tread member 16 and the joining portion 13a of the ring-shaped body 13.

In the maximum outer diameter portion 16a of the tread member 16, the size (thickness) H1 of the base rubber portion 41 along the tire radial direction is larger than the size (thickness) H2 of the cap rubber portion 42 along the tire radial direction. On the inner peripheral surface of the tread member 16, the size (width) W2 of the base rubber portion 41 along the tire width direction H is smaller than the sum of the sizes (widths) W1 and W3 along the respective tire width direction H of portions positioned on both outer sides of the base rubber portion 41 in the tire width direction H in the cap rubber portion 42.

In addition, the sum of the size (thickness) H1 of the base rubber portion 41 along the tire radial direction and the size (thickness) H2 of the cap rubber portion 42 along the tire radial direction is set to the vertical width H0 of the maximum outer diameter portion 16a of the tread member 16. Further, the lateral width of the tread member 16 along the tire width direction H is set to W0, that is, W0 is the sum of the size (width) W2 of the base rubber portion 41 along the tire width direction H and each size (Width) W1 and W3 of each of the portions positioned on both outer sides of the base rubber portion 41 in the tire width direction H in the cap rubber portion 42. Here, the ratio (W0/H0) of the lateral width W0 of the tread member 16 along the tire width direction H to the longitudinal width H0 of the maximum outer diameter portion 16a of the tread member 16 has a relationship that is greater than the ratio (W2/H1) of the size (width) W2 of the base rubber portion 41 along the tire width direction H to the size (thickness) H1 of the base rubber portion 41 along the tire radial direction.

Here, the base rubber portion 41 and the cap rubber portion 42 are made of two types of rubbers which are different from each other. The base rubber portion 41 and the cap rubber portion 42 are formed of vulcanized rubber in which natural rubber and/or a rubber composition are vulcanized. The rigidity of the base rubber portion 41 is lower than the rigidity of the cap rubber portion 42. In the present embodiment, the rubber hardness Gb of the base rubber portion 41 is lower than the rubber hardness Gc of the cap rubber portion 42. The rubber hardness Gb of the base rubber portion 41 and the rubber hardness Gc of the cap rubber portion 42 satisfy $30<Gb<Gc<80$. The rubber hardness (Japanese Industrial Standard JIS-A hardness) was measured by a durometer A in accordance with Japanese Industrial Standard JIS K 6253. In addition, the elastic modulus Eb of the base rubber portion 41 is lower than the elastic modulus Ec of the cap rubber portion 42. The elastic modulus Eb of the base rubber portion 41 and the elastic modulus Ec of the cap rubber portion 42 satisfy $0.1 \text{ MPa}<Eb<Ec<100 \text{ MPa}$. The elastic modulus was measured by a tensile tester according to Japanese Industrial Standard JIS K 6254: 2010.

As described above, according to the non-pneumatic tire 1 related to the present embodiment, since the rigidity of the base rubber portion 41 positioned on the inner side in the tire radial direction is lower than the rigidity of the cap rubber portion 42 positioned outside in the tire radial direction, as shown in FIG. 6, when a load is applied to the tread member 16, the stress generated in the tread member 16 disperses in the base rubber portion 41, and local concentration and transfer of stress on the ring-shaped body 13 can be suppressed.

On the other hand, since the cap rubber portion 42 having high rigidity is positioned outside the tire radial direction with respect to the base rubber portion 41 having low rigidity, wear resistance and impact resistance of the tread member 16 can be secured by the cap rubber portion 42 and the driving stability of the non-pneumatic tire 1 can also be secured.

As described above, while local concentration and transfer of stress generated in the tread member 16 to the ring-shaped body 13 are suppressed by the base rubber portion 41, the wear resistance and the impact resistance of the tread member 16 can be secured by the cap rubber portion 42 and the strength of the non-pneumatic tire 1 can be improved.

In addition, the outer diameter of the tread member 16 decreases as the tread member goes away from the maximum outer diameter portion 16a in the tire width direction H, and when a load is applied to the tread member 16, a large stress is likely to be generated to the maximum outer diameter portion 16a of the tread member 16.

Here, the base rubber portion 41 is disposed on the maximum outer diameter portion 16a of the tread member 16 along the tire width direction H. Therefore, as described above, large stress generated in the maximum outer diameter portion 16a of the tread member 16 can disperse in the base rubber portion 41, and the local concentration and transfer of stress to the ring-shaped body 13 can be suppressed effectively.

In addition, the ring-shaped body 13 is formed by the end portions of the plurality of first and second ring-shaped bodies 23 and 24 in the tire width direction H being connected to each other. In addition, the joining portion 13a formed by connecting the end portions of the plurality of first and second ring-shaped bodies 23 and 24 of the ring-shaped body 13 in the tire width direction H to each other has lower strength than the other portions thereof. Therefore, when a large stress is transferred from the tread member 16 to the joining portion 13a, there is a possibility that large damage is caused to the ring-shaped body 13 from the joining portion 13a as a starting point.

Here, since the base rubber portion 41 covers the joining portion 13a from the outside in the tire radial direction, the stress transferred from the tread member 16 to the joining portion 13a of the ring-shaped body 13 disperses in the base rubber portion 41. Therefore, the transfer and the concentration of the stress to the joining portion 13a can be reliably suppressed and the occurrence of damage to the ring-shaped body 13 can be effectively suppressed.

In a case where the ring-shaped body 13 is formed by injection molding, when the weld is formed on the ring-shaped body 13, the weld of the ring-shaped body 13 has lower strength than the other portions. Therefore, by covering the weld from the outside in the tire radial direction by the base rubber portion 41 together with the joining portion 13a or in place of the joining portion 13a, the occurrence of damage to the ring-shaped body 13 can be effectively suppressed.

In addition, since the cap rubber portion 42 covers the entire base rubber portion 41, exposure of the base rubber portion 41 to the outside is prevented, for example, damage of the base rubber portion 41 by direct contact with the road surface can be prevented and the strength can be reliably improved.

In addition, since the outer peripheral surface of the base rubber portion 41 forms a curved surface shape protruding outward in the tire radial direction in a cross-sectional view taken along the tire width direction H, the stress in the base rubber portion 41 can effectively disperse even at the time of the camber input to the non-pneumatic tire 1.

In addition, since the rubber hardness Gb of the base rubber portion 41 is lower than the rubber hardness Gc of the cap rubber portion 42, stress generated in the tread member 16 can effectively disperse in the base rubber portion 41.

Furthermore, since the rubber hardness Gb of the base rubber portion 41 and the rubber hardness Gc of the cap rubber portion 42 satisfy 30<Gb<Gc<80, the stress generated in the tread member 16 can more effectively disperse in the base rubber portion 41.

In addition, since the elastic modulus Eb of the base rubber portion 41 is lower than the elastic modulus Ec of the cap rubber portion 42, stress generated in the tread member 16 can effectively disperse in the base rubber portion 41.

Furthermore, since the elastic modulus Eb of the base rubber portion 41 and the elastic modulus Ec of the cap rubber portion 42 satisfy 0.1 MPa<Eb<Ec<100 MPa, the stress generated in the tread member 16 more effective disperse in the base rubber portion 41.

The technical scope of the invention is not limited to the above embodiment, and various modifications can be made without departing from the scope of the invention.

For example, in the above embodiment, there is shown a configuration in which both of one first connection plate 21 and one second connection plate 22 are provided as the connection member 15. However, instead of this, a plurality of first connection plates 21 and a plurality of second connection plates 22 may be provided for one connection member 15 so that positions thereof in the tire width direction H are different from each other. In addition, a plurality of connection members 15 may be provided between the exterior body 12 and the ring-shaped body 13 along the tire width direction H.

In addition, instead of the above embodiment, the second end portions 21b and 22b of the first connection plate 21 and the second connection plate 22 may be respectively connected to positions opposite to each other, for example, interposing the axis O in the outer peripheral surface of the exterior body 12 in the tire radial direction. Alternatively, on the outer peripheral surface of the exterior body 12, the second end portions 21b and 22b of the first connection plate 21 and the second connection plate 22 may be connected to a position opposing to each of the first end portions 21a and 22a of the first connection plate 21 and the second connection plate 22 in the tire radial direction. In addition, instead of the above embodiment, the first end portions 21a and 22a of the first connection plate 21 and the second connection plate 22 may be respectively connected to different positions from each other in the tire peripheral direction in the inner peripheral surface of the ring-shaped body 13.

Furthermore, in the above embodiment, a gap in the tire width direction H may be provided or may not be provided between the first exterior body 25 and the second exterior body 26. In addition, the exterior body 12 and the ring-shaped body 13 may be divided or may not be divided into three or more in the tire width direction H.

Furthermore, in the embodiment described above, the exterior body 12, the ring-shaped body 13, and the connection member 15 are integrally formed by, for example, injection molding, but the forming method is not limited to injection molding and the exterior body 12, the ring-shaped body 13, and the connection member 15 may be integrally formed by casting or the like. In addition, after the exterior body 12, the ring-shaped body 13, and the connection member 15 are separately formed, the exterior body 12, the ring-shaped body 13, and the connection member 15 may be connected to each other.

In addition, the exterior body 12 and the attachment body 11 may be integrally formed. In other words, the exterior body 12 may be included in the attachment body 11.

Furthermore, in the embodiment described above, the connection member 15 is indirectly connected to the attachment body 11 via the exterior body 12, but it is not limited thereto and for example, the connection member 15 may be directly connected to the attachment body 11.

Besides, each configuration (constituent elements) described in the embodiment described above, modification example, and still further writing may be combined with each other without departing from the scope of the invention and in addition, additions, omissions, substitutions, and other changes to the configuration are possible. In addition, the invention is not limited to the embodiments described above and is limited only by the claims.

Next, a verification test on the operational effects described above was carried out.

As an example, the non-pneumatic tire 1 shown in FIGS. 1 to 6 was adopted, and as a comparative example, a non-pneumatic tire in which the tread member 16 has a single layer structure made of the same material as the cap rubber portion 42 is adopted in the non-pneumatic tire of the example.

The outer diameters of these non-pneumatic tires and the dimensions of W1 to W3, H1 and H2 shown in FIG. 5 were set to the sizes shown in Table 1 below. The unit of the value described in the second line of Table 1 is mm.

TABLE 1

| Tire Outer Diameter R | W1 | W2 | W3 | H1 | H2 |
|---|---|---|---|---|---|
| 150 | 15 | 20 | 15 | 6 | 4 |

(unit: mm)

The rubber hardness and elastic modulus of the base rubber portion 41 and the cap rubber portion 42 in the non-pneumatic tire 1 of the example were set to the sizes shown in Table 2 below.

TABLE 2

| | Base Rubber Portion | Cap Rubber Portion |
|---|---|---|
| Rubber Hardness | 60 | 65 |
| Elasticity Modulus (MPa) | 35 | 40 |

For these two types of non-pneumatic tires, the driving distance was measured until the tire was broken by using a drum tester and driving at 60 km/h in a state where a load of 1000 N is applied.

As a result, it was confirmed that the driving distance was increased by 20% in the non-pneumatic tire 1 of the example compared to the non-pneumatic tire of the comparative example.

INDUSTRIAL APPLICABILITY

According to the non-pneumatic tire of the invention, the strength can be improved.

REFERENCE SIGNS LIST 1 non-pneumatic tire
11 attachment body
13 ring-shaped body (outer tube body)
13a joining portion
15 connection member
16 tread member
16a maximum outer diameter portion
23 first ring-shaped body (divided tube)
24 second ring-shaped body (divided tube)
41 base rubber portion
42 cap rubber portion
H tire width direction

The invention claimed is:

1. A non-pneumatic tire comprising:
an attachment body that is attached to an axle;
an outer tube body that surrounds the attachment body from an outside in a tire radial direction;
a connection member that connects the attachment body and the outer tube body to each other; and
a cylindrical tread member that is externally mounted on the outer tube body,
wherein the tread member includes a base rubber portion that is positioned at an inside in the tire radial direction and a cap rubber portion that is positioned at an outside of the base rubber portion in the tire radial direction,
wherein rigidity of the base rubber portion is lower than rigidity of the cap rubber portion,
wherein the outer tube body is formed by both ends of a plurality of divided tubes in a tire width direction disposed adjacent to each other in the tire width direction being connected to each other, and
wherein the base rubber portion covers a joining portion in which both ends of the plurality of divided tubes in the tire width direction are connected to each other from the outside in the tire radial direction.

2. The non-pneumatic tire according to claim 1,
wherein an outer peripheral surface of the tread member has a curved surface shape protruding outward in the tire radial direction in a cross-sectional view taken along the tire width direction and the outer diameter of the tread member decreases as the tread member goes away from a maximum outer diameter portion in the tire width direction, and
wherein the base rubber portion is disposed on the maximum outer diameter portion of the tread member along the tire width direction.

3. The non-pneumatic tire according to claim 2,
wherein the cap rubber portion covers the entire base rubber portion.

4. The non-pneumatic tire according to claim 3,
wherein the outer peripheral surface of the base rubber portion has a curved surface shape protruding outward in the tire radial direction in a cross-sectional view taken along the tire width direction.

5. The non-pneumatic tire according to claim 2,
wherein the rubber hardness Gb of the base rubber portion is lower than the rubber hardness Gc of the cap rubber portion.

6. The non-pneumatic tire according to claim 1,
wherein the cap rubber portion covers the entire base rubber portion.

7. The non-pneumatic tire according to claim 6,
wherein the outer peripheral surface of the base rubber portion has a curved surface shape protruding outward in the tire radial direction in a cross-sectional view taken along the tire width direction.

8. The non-pneumatic tire according to claim 6,
wherein the rubber hardness Gb of the base rubber portion is lower than the rubber hardness Gc of the cap rubber portion.

9. The non-pneumatic tire according to claim 1,
wherein the rubber hardness Gb of the base rubber portion is lower than the rubber hardness Gc of the cap rubber portion.

10. The non-pneumatic tire according to claim 9,
wherein the rubber hardness Gb of the base rubber portion and the rubber hardness Gc of the cap rubber portion satisfy $30 < Gb < Gc < 80$.

11. The non-pneumatic tire according to claim 1,
wherein the elastic modulus Eb of the base rubber portion is lower than the elastic modulus Ec of the cap rubber portion.

12. The non-pneumatic tire according to claim 11,
wherein the elastic modulus Eb of the base rubber portion and the elastic modulus Ec of the cap rubber portion satisfy $0.1 \text{ MPa} < Eb < Ec < 100 \text{ MPa}$.

* * * * *